United States Patent
Yoshida et al.

(10) Patent No.: US 9,292,369 B2
(45) Date of Patent: Mar. 22, 2016

(54) APPARATUS MANAGEMENT SYSTEM, ELECTRONIC APPARATUS, APPARATUS MANAGEMENT METHOD, AND COMPUTER READABLE RECORDING MEDIUM

(71) Applicant: KYOCERA Document Solutions Inc.

(72) Inventors: Daisuke Yoshida, Osaka (JP); Toyoaki Oku, Osaka (JP); Koki Nakajima, Osaka (JP); Takeshi Nakamura, Osaka (JP); Yoshihiko Arai, Osaka (JP); Atsushi Matsumoto, Osaka (JP)

(73) Assignee: Kyocera Document Solutions, Inc. (JP)

( * ) Notice: Subject to any disclaimer, the term of this patent is extended or adjusted under 35 U.S.C. 154(b) by 196 days.

(21) Appl. No.: 14/201,793

(22) Filed: Mar. 8, 2014

(65) Prior Publication Data

US 2014/0268226 A1    Sep. 18, 2014

(30) Foreign Application Priority Data

Mar. 12, 2013  (JP) .................. 2013-049657
Mar. 12, 2013  (JP) .................. 2013-049660
Mar. 26, 2013  (JP) .................. 2013-065225

(51) Int. Cl.
G06F 3/12       (2006.01)
G06F 11/07      (2006.01)
H04N 1/00       (2006.01)

(52) U.S. Cl.
CPC ........ *G06F 11/0733* (2013.01); *H04N 1/00344* (2013.01); *H04N 1/00954* (2013.01)

(58) Field of Classification Search
USPC .................. 709/219, 223, 224, 206, 202, 227
See application file for complete search history.

(56) References Cited

U.S. PATENT DOCUMENTS

| | | | | |
|---|---|---|---|---|
| 8,896,865 B2 * | 11/2014 | Yamaguchi | ............. | G06F 3/121 358/1.13 |
| 2004/0257225 A1* | 12/2004 | Webb, Sr. | ............. | G06Q 10/08 340/539.26 |
| 2006/0227373 A1 | 10/2006 | Matoba | | |
| 2011/0075204 A1 | 3/2011 | Yoshimura | | |
| 2011/0216354 A1 | 9/2011 | Naito | | |
| 2012/0317259 A1* | 12/2012 | Shikano | ............. | H04L 12/6418 709/223 |

FOREIGN PATENT DOCUMENTS

| | | |
|---|---|---|
| JP | 2002-063004 | 2/2002 |
| JP | 2004-227104 | 8/2004 |

(Continued)

*Primary Examiner* — Jude Jean Gilles

(57) ABSTRACT

An agent unit acquires apparatus status information that indicates a status of the electronic apparatus from an electronic apparatus. A remote maintenance server transmits an acquisition instruction of the apparatus status information to the agent unit and receives the apparatus status information from the agent unit if acquisition of the apparatus status information succeeded. The remote maintenance server (a) acquires operation schedule information on the electronic apparatus, (b) transmits an acquisition instruction of the apparatus status information to the agent unit, (c) registers a retransmission schedule of the acquisition instruction so as to transmit the acquisition instruction at a timing within an operation period of the electronic apparatus determined from the operation schedule if acquisition of the apparatus status information failed, and (d) transmits the acquisition instruction to the agent unit at the timing of the retransmission schedule.

24 Claims, 12 Drawing Sheets

(56) References Cited

FOREIGN PATENT DOCUMENTS

| | | |
|---|---|---|
| JP | 2006-293775 | 10/2006 |
| JP | 2011-076308 | 4/2011 |
| JP | 2011-164862 | 8/2011 |
| JP | 2012-244205 | 12/2012 |

* cited by examiner

APPARATUS MANAGEMENT SYSTEM, ELECTRONIC APPARATUS, APPARATUS MANAGEMENT METHOD, AND COMPUTER READABLE RECORDING MEDIUM

CROSS-REFERENCE TO RELATED APPLICATIONS

This application relates to and claims priority rights from Japanese Patent Application No. 2013-049657, filed on Mar. 12, 2013, Japanese Patent Application No. 2013-049660, filed on Mar. 12, 2013, and Japanese Patent Application No. 2013-065225, filed on Mar. 26, 2013, the entire disclosures of which are hereby incorporated by reference herein.

BACKGROUND

1. Field of the Present Disclosure

The present disclosure relates to an apparatus management system, an electronic apparatus, an apparatus management method, and a computer readable recording medium.

2. Description of the Related Art

In a remote monitoring system, report information produced in an image forming apparatus is transmitted to a monitoring device through a local network, and the monitoring device stores the report information so as to be related to each image forming apparatus, and transmits the stored report information to a monitoring center through a network.

However, when an electronic apparatus (e.g. an image forming apparatus) as a monitored object is not in operation (for example, in power off status), apparatus status information used for apparatus management can not be acquired from the electronic apparatus. Therefore, it is difficult for the center side to smoothly manage the electronic apparatus.

In addition, if information used for monitoring does not reach the monitoring device or the like, then it can not be determined whether the reason is out-of-operation status of the electronic apparatus or temporal communication failure and it can not be determined when acquisition of the apparatus status information will be tried again.

SUMMARY

An apparatus management system according to an aspect of the present disclosure, includes: an electronic apparatus; an agent unit configured to acquire apparatus status information that indicates a status of the electronic apparatus from the electronic apparatus; and a remote maintenance server configured to transmit an acquisition instruction of the apparatus status information to the agent unit and receive the apparatus status information from the agent unit if acquisition of the apparatus status information succeeded. The remote maintenance server is further configured (a) to acquire operation schedule information on the electronic apparatus, (b) to transmit an acquisition instruction of the apparatus status information to the agent unit, (c) to register a retransmission schedule of the acquisition instruction so as to transmit the acquisition instruction at a timing within an operation period of the electronic apparatus determined from the operation schedule if acquisition of the apparatus status information failed, and (d) to transmit the acquisition instruction to the agent unit at the timing of the retransmission schedule.

An apparatus management method according to an aspect of the present disclosure, includes the steps of: transmitting an acquisition instruction of apparatus status information that indicates a status of an electronic apparatus to an agent unit that acquires the apparatus status information from the electronic apparatus; acquiring operation schedule information on the electronic apparatus from the agent unit by a remote maintenance server that receives the apparatus status information from the agent unit and transmitting an acquisition instruction of the apparatus status information to the agent unit by the remote maintenance server, if acquisition of the apparatus status information succeeded; and registering a retransmission schedule of the acquisition instruction by the remote maintenance server so as to transmit the acquisition instruction at a timing within an operation period of the electronic apparatus determined from the operation schedule information, and transmitting the acquisition instruction to the agent unit at the timing of the retransmission schedule by the remote maintenance server, if acquisition of the apparatus status information failed.

An electronic apparatus according to an aspect of the present disclosure, includes an agent unit configured to transmit apparatus status information that indicates a status of an electronic apparatus to a remote maintenance server on a maintenance service provider side. The agent unit (a) receives transmission schedule information on the apparatus status information from the remote maintenance server, (b) acquires operation schedule information on the electronic apparatus set in the electronic apparatus, (c) determines a transmission timing of the apparatus status information on the basis of both the transmission schedule information and the operation schedule information, and (d) transmits the apparatus status information to the remote maintenance server at the transmission timing.

An apparatus management system according to an aspect of the present disclosure, includes the aforementioned electronic apparatus, and the remote maintenance server.

An apparatus management system according to an aspect of the present disclosure, includes: an electronic apparatus; an agent unit configured to acquire apparatus status information that indicates a status of the electronic apparatus from the electronic apparatus; a remote maintenance server configured to transmit an acquisition instruction of the apparatus status information to the agent unit and receive the apparatus status information from the agent unit; and a service terminal apparatus configured to cause the remote maintenance server to output the acquisition instruction of the apparatus status information. The remote maintenance server is further configured (a) to acquire operation schedule information on the electronic apparatus, and (b) to perform warning notification to the service terminal apparatus if a transmission timing of the acquisition instruction of the apparatus status information specified by the service terminal apparatus is out of an operation period determined from the operation schedule information.

An apparatus management method according to an aspect of the present disclosure, includes the steps of: transmitting an acquisition instruction of apparatus status information that indicates a status of an electronic apparatus to an agent unit that acquires the apparatus status information from the electronic apparatus, and acquiring operation schedule information on the electronic apparatus by a remote maintenance server that receives the apparatus status information from the agent unit; and performing warning notification to a service terminal apparatus by the remote maintenance server if a transmission timing of an acquisition instruction of the apparatus status information specified by the service terminal apparatus is out of an operation period determined from the operation schedule information.

A non-transitory computer readable recording medium according to an aspect of the present disclosure stores an apparatus management program. In a remote maintenance server that receives apparatus status information that indicates a status of an electronic apparatus from an agent unit that acquires the apparatus status information from the electronic apparatus, the apparatus management program causes a computer to perform the steps of: transmitting an acquisition instruction of the apparatus status information to the agent unit; acquiring operation schedule information on the electronic apparatus from the agent unit if acquisition of the apparatus status information succeeded; and registering a retransmission schedule of the acquisition instruction so as to transmit the acquisition instruction at a timing within an operation period of the electronic apparatus determined from the operation schedule information, and transmitting the acquisition instruction to the agent unit at the timing of the retransmission schedule, if acquisition of the apparatus status information failed.

A non-transitory computer readable recording medium according to an aspect of the present disclosure stores an apparatus management program. The apparatus management program that causes a computer to act as an agent unit that transmits apparatus status information that indicates a status of an electronic apparatus to a remote maintenance server on a maintenance service provider side. The agent unit (a) receives transmission schedule information on the apparatus status information from the remote maintenance server, (b) acquires operation schedule information on the electronic apparatus set in the electronic apparatus, (c) determines a transmission timing of the apparatus status information on the basis of both the transmission schedule information and the operation schedule information, and (d) transmits the apparatus status information to the remote maintenance server at the transmission timing.

A non-transitory computer readable recording medium according to an aspect of the present disclosure stores an apparatus management program. In a remote maintenance server that receives apparatus status information that indicates a status of an electronic apparatus from an agent unit that acquires the apparatus status information from the electronic apparatus, the apparatus management program causes a computer to perform the steps of: transmitting an acquisition instruction of the apparatus status information to the agent unit, and acquiring operation schedule information on the electronic apparatus; and performing warning notification to a service terminal apparatus if a transmission timing of an acquisition instruction of the apparatus status information specified by the service terminal apparatus is out of an operation period determined from the operation schedule information.

These and other objects, features and advantages of the present disclosure will become more apparent upon reading of the following detailed description along with the accompanied drawings.

DETAILED DESCRIPTION

Hereinafter, an embodiment according to an aspect of the present disclosure will be explained with reference to drawings.

Embodiment 1

Figure 1:
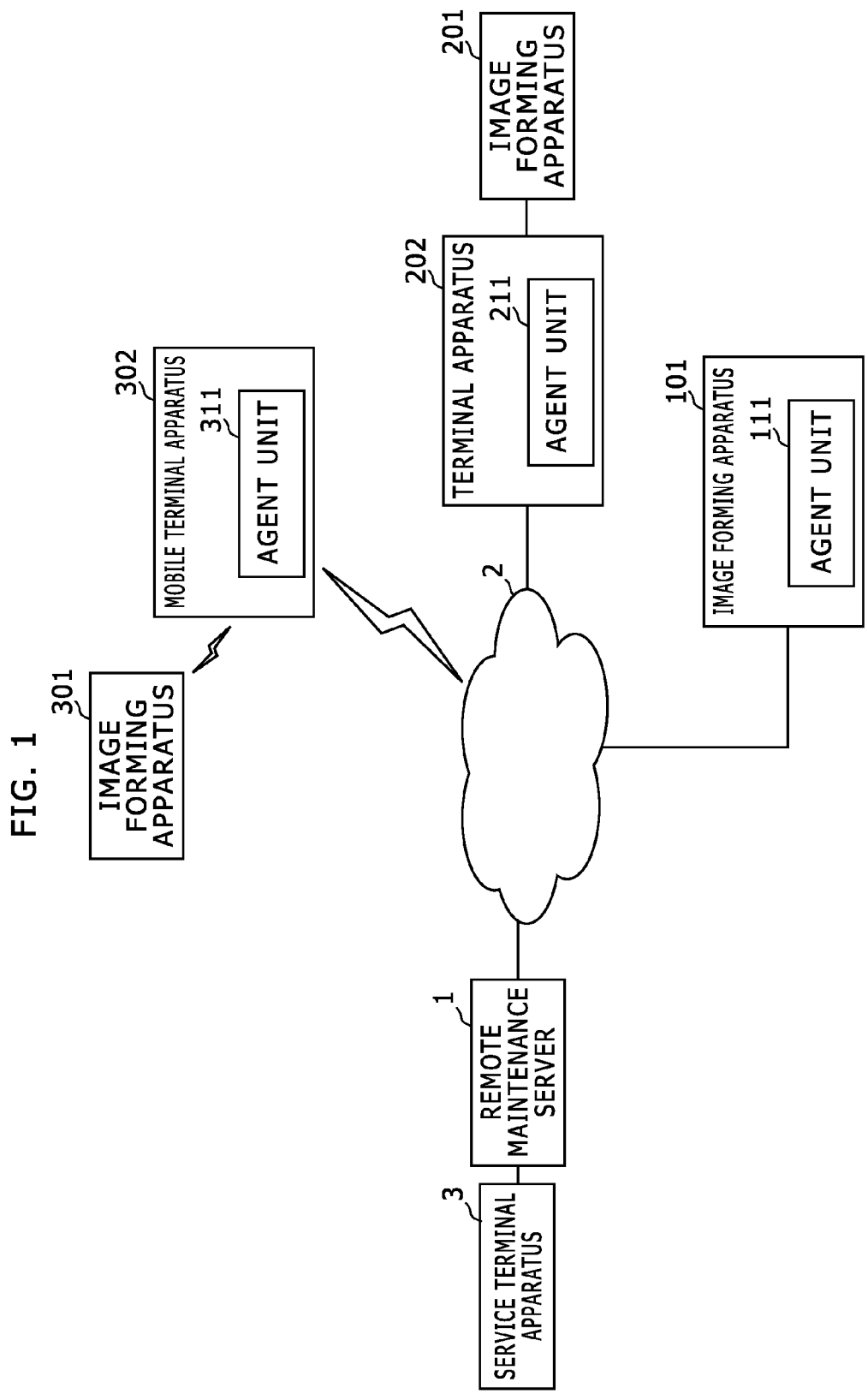
FIG. 1 shows a configuration of an apparatus management system according to an embodiment of the present disclosure.

FIG. 1 shows a configuration of an apparatus management system according to an embodiment of the present disclosure. In the system shown in FIG. 1, plural image forming apparatuses 101, 201 and 301 are located on respective customer sides of maintenance service. On a maintenance service provider side, a remote maintenance server 1 is located. The remote maintenance server 1 acquires apparatus status information on the plural image forming apparatus 101, 201 and 301 for the maintenance service.

The remote maintenance server 1 is connected to a network 2. Further, the image forming apparatus 101 is connected to the network 2, the image forming apparatus 201 is connected to a terminal apparatus 202 connected to the network 2, and the image forming apparatus 301 is not connected to the network 2 and is in stand-alone status. Contrarily, a mobile terminal apparatus 302 is located near the image forming apparatus 301 and capable of wireless communication with the image forming apparatus 301 using a near field communication method. The mobile terminal apparatus 302 is also capable of connecting to the network 2 using wireless communication. The mobile terminal apparatus 302 is carried by a field service person who visits a customer's site.

The image forming apparatus 101, the terminal apparatus 202 and the mobile terminal apparatus 302 capable of connecting to the network 2 include agent units 111, 211 and 311, respectively. The agent units 111, 211 and 311 perform data communication with the remote maintenance server 1 through the network 2. Each one of the agent units 111, 211 and 311 has a snapshot function that acquires apparatus status information that indicates a current status of the image forming apparatus 101, 201 or 301 and transmits the apparatus status information to the remote maintenance server 1 through the network 2.

The apparatus status information includes an event log, statuses of consumable goods (e.g. toner, a drum and so forth), sorts of counter information, and so forth.

To the remote maintenance server 1, a service terminal apparatus 3 is connected. The service terminal apparatus 3 is located, for example, in a remote service center or the like of the maintenance service provider side, used by a service person in the center, and transmits an acquisition instruction of the apparatus status information, a reading request of the acquired apparatus status information, and the like to the remote maintenance server 1 in accordance with an operation by the service person.

Further, each one of the aforementioned agent units 111 and 211 has a digital note function that causes an operation panel of the image forming apparatus 101 or 201 to display a message screen on the basis of a message display instruction from the remote maintenance server 1. In accordance with an operation by a service person in the center, the service terminal apparatus 3 transmits the message display instruction and the like to the remote maintenance server 1.

Figure 2:
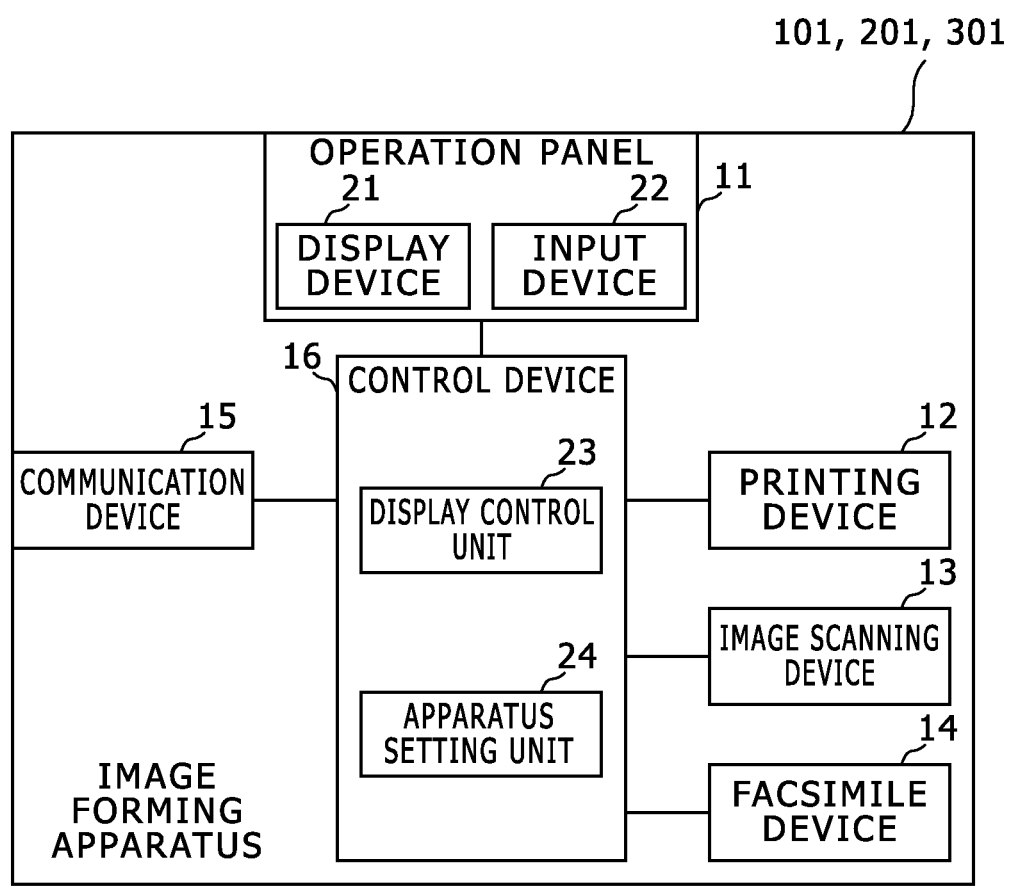
FIG. 2 shows a configuration of image forming apparatuses 101, 201 and 301 shown in FIG. 1.

FIG. 2 shows a configuration of the image forming apparatuses 101, 201 and 301 shown in FIG. 1.

Each one of the image forming apparatuses 101, 201 and 301 is an electronic apparatus, here, multi function peripheral.

Each one of the image forming apparatuses 101, 201 and 301 includes an operation panel 11, a printing device 12, an image scanning device 13, a facsimile device 14, a communication device 15, and a control device 16.

The operation panel 11 is arranged on a top surface of a housing of the image forming apparatus 101, 201 or 301, and includes a display device 21 that displays a screen to a user and an input device 22 that receives an operation by the user. The display device 21 includes a crystal liquid display or the like. The input device 22 includes a hard key, a touch panel that forms a soft key in cooperation with the display device 21, or the like.

The printing device 12 is an internal device that performs printing an image based on image data, for example, in an electrographic manner. The image scanning device 13 is an internal device that optically scans a document image of a document and generates image data of the document image. The facsimile device 14 is an internal device that transmits a facsimile signal of a document image and receives a facsimile signal and generates image data of a document image from the received facsimile signal. The communication device 15 includes a network interface, a modem, a peripheral device interface such as a USB (Universal Serial Bus) interface, a near field wireless communication interface such as a Bluetooth (trademark) interface, or the like.

The control device 16 includes a computer and forms sorts of processing units by loading a message display control program and the like from an unshown storage device or a recording medium and executing the programs. The control device 16 forms a display control unit 23 and an apparatus setting unit 24.

The display control unit 23 controls display of a screen on the display device 21 of the operation panel 11.

The apparatus setting unit 24 sets setting values to sorts of setting items. For example, the setting value is specified by a user operation to the operation panel 11.

For example, the apparatus setting unit 24 newly sets operation schedule information on the image forming apparatus 101, 201 or 301 and changes the operation schedule information on the basis of a user operation. The operation schedule information includes a weekly timer setting, a calendar setting, a nighttime printing prohibition setting or the like. In the weekly timer setting, timings of power-on and power-off are set for each day (Monday, . . . , Sunday) of the week and/or each one of time periods (e.g. 0:00 to 1:00, . . . , 23:00 to 24:00) in the day. In the calendar setting, power-on or power-off is set for each day. In the nighttime output prohibition setting, a time period in which machine operation is stopped in the nighttime is set.

It should be noted that in the image forming apparatus 101, the agent unit 111 is formed in the control device 16. Further, the agent units 111, 211 and 311 are formed by executing programs using computers in the apparatus 101, 202 and 302, respectively.

Figure 3:
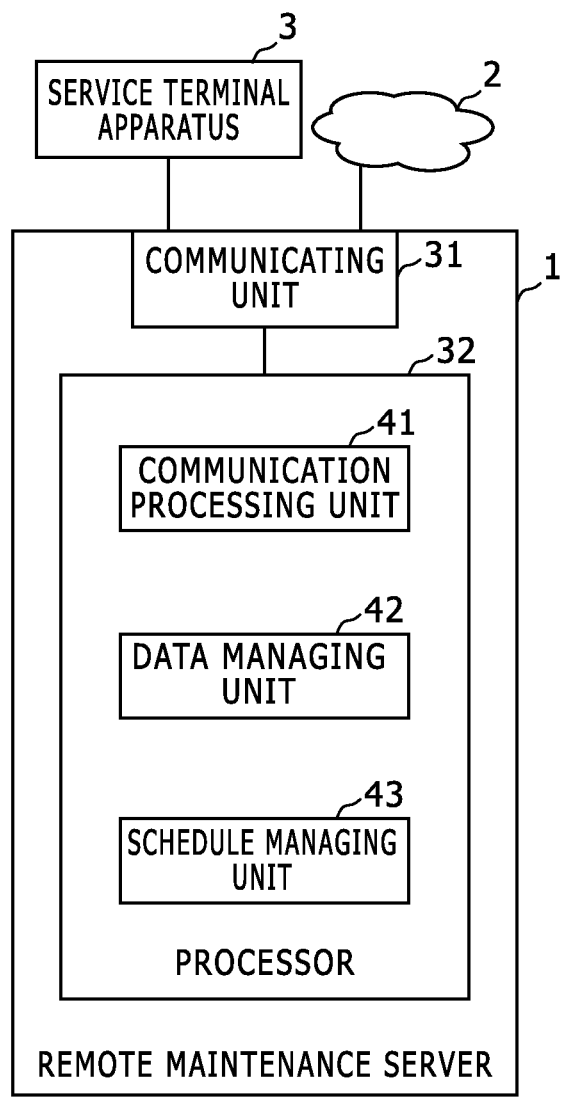
FIG. 3 shows a configuration of a remote maintenance server 1 shown in FIG. 1.

FIG. 3 shows a configuration of the remote maintenance server 1 shown in FIG. 1. The remote maintenance server 1 includes a communicating unit 31 and a processor 32.

The communicating unit 31 includes a communication circuit that performs data communication with the service terminal apparatus 3 and a communication circuit that performs data communication with the agent units 111, 211 and 311 through the network 2.

The processor 32 includes a computer and forms sorts of processing units by loading an apparatus management program from an unshown storage device or a recording medium to a RAM (Random Access Memory) and executing the programs with a CPU (Central Processing Unit). The processor 32 forms a communication processing unit 41, a data managing unit 42, and a schedule managing unit 43.

The communication processing unit 41 performs data communication with the service terminal apparatus 3 and data communication with the agent units 111, 211 and 311 through the network 2 using the communicating unit 31.

The data managing unit 42 receives apparatus status information from the agent unit 111, 211 or 311 and stores the received apparatus status information in an unshown storage device, a database or the like.

The schedule managing unit 43 transmits an acquisition instruction of apparatus status information to the agent unit 111 or 211 corresponding to the image forming apparatus 101 or 201 as an object from which apparatus status information is acquired, and receives the apparatus status information from the agent unit 111 or 211 using the communicating unit 31 and the communication processing unit if the agent units 111 or 211 succeeded in the acquisition of the apparatus status information.

The received apparatus status information is stored so as to be related to identification information on the image forming apparatus by the data managing unit 42, and the data managing unit 42 transmits the stored apparatus status information to the service terminal apparatus 3 as a response to a request received from the service terminal apparatus 3 on the maintenance service provider side.

Further, the schedule managing unit 43 (a) acquires operation schedule information on the image forming apparatus 101 or 201, (b) transmits an acquisition instruction of apparatus status information to the agent unit 111 or 211, (c) registers a retransmission schedule of the acquisition instruction so as to transmit the acquisition instruction at a timing within operation period of the image forming apparatus 101 or 201 determined from the operation schedule information if the agent units 111 or 211 failed in the acquisition of the apparatus status information, and (d) automatically transmits the acquisition instruction again to the agent unit 111 or 211 at the timing of the retransmission schedule.

Further, the schedule managing unit 43 receives a part or all of the operation schedule information from the agent unit 111 or 211. This operation schedule information is operation schedule information that was set by the aforementioned apparatus setting unit 24 and acquired from the apparatus setting unit 24 by the agent unit 111 or 211.

In Embodiment 1, the schedule managing unit 43 (a) transmits an acquisition instruction of the apparatus status information to the agent unit 111 or 211 immediately upon receiving an acquisition instruction of the apparatus status information from the server terminal apparatus 3 on the maintenance service provider side, and (b) transmits an acquisition failure notification to the service terminal apparatus 3 and registers a retransmission schedule of the acquisition instruction so as to transmit the acquisition instruction at a timing specified by the service terminal apparatus 3 (i.e. by a service person in the center) within an operation period of the image forming apparatus 101 or 201 determined from the operation schedule information if the agent units 111 or 211 failed in the acquisition of the apparatus status information.

The operation schedule information may include operating day calendar information on an organization that uses the image forming apparatus 101 or 201. Such operating day calendar information may be imported to the image forming apparatus 101 or 201 by an administrator of the image forming apparatus 101 or 201 or may be downloaded through the network 2 from a server of the organization by the schedule managing unit 43. In such a case, the schedule managing unit 43 registers a retransmission schedule of the acquisition instruction so as to transmit the acquisition instruction at a timing within a day other than a holiday of the organization determined from the operating data calendar information if the agent units 111 or 211 failed in the acquisition of the apparatus status information.

In the following part, an apparatus management process in Embodiment 1 is explained.

Figure 4:
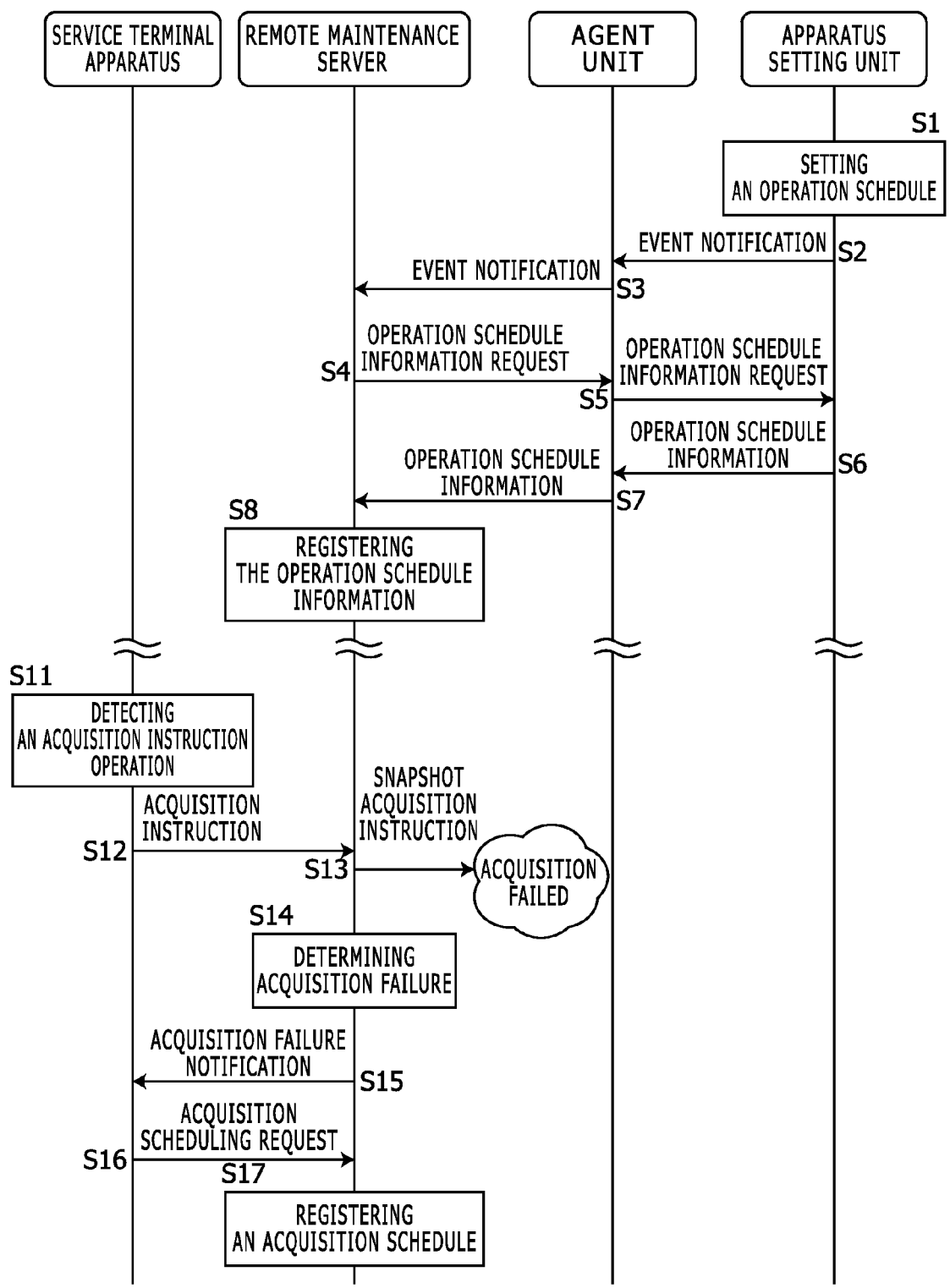
FIG. 4 shows an apparatus management process in Embodiment 1.

FIG. 4 shows an apparatus management process in Embodiment 1. Management of the image forming apparatus 101 using the agent unit 111 is explained here, and management of the image forming apparatus 201 is also performed in the same manner using the agent unit 211.

When an end user inputs operation schedule information to newly set or change an operation schedule by operating the operation panel 11 of the image forming apparatus 101, the apparatus setting unit 24 registers the operation schedule as an apparatus setting in the image forming apparatus 101 (in Step S1). When registering the apparatus setting on the operation schedule, the apparatus setting unit 24 outputs an event notification to the agent unit 111 (in Step S2). This event notification indicates that addition and/or change of the apparatus setting on the operation schedule occurred.

Upon receiving this event notification, the agent unit 111 transmits the event notification to the remote maintenance server 1 through the network 2 using the communication device 15 (in Step S3).

In the remote maintenance server 1, the schedule managing unit 43 receives the event notification using the communication processing unit 41 and the communicating unit 31, and transmits an operation schedule information request to the agent unit 111, that is, the sender of the received event notification (in Step S4).

Upon receiving the request, the agent unit 111 transmits the request to the apparatus setting unit 24 (in Step S5) and acquires an apparatus setting on operation schedule from the apparatus setting unit 24 (in Step S6), and transmits the acquired apparatus setting as an operation schedule information to the remote maintenance server 1 through the network 2 using the communication device 15 (in Step S7).

In the remote maintenance server 1, the schedule managing unit 43 receives the operation schedule information using the communication processing unit 41 and the communicating unit 31 and stores the received operation schedule information so as to be related to identification information on the image forming apparatus 101 (in Step S8).

Every time when the operation schedule of the image forming apparatus is added or changed, in the remote maintenance server 1, the schedule managing unit 43 stores the operation schedule information and consequently, the operation schedule information of the image forming apparatus 101 is updated.

On the other hand, when a service person performs an operation to the service terminal apparatus 3 for an acquisition instruction of apparatus status information on the image forming apparatus 101, the service terminal apparatus 3 detects this operation (in Step S11), and outputs the acquisition instruction of apparatus status information on the image forming apparatus 101 to the remote maintenance server 1 (in Step S12).

In the remote maintenance server 1, upon receiving the acquisition instruction using the communication processing unit 41 and the communicating unit 31, the schedule managing unit 43 immediately transmits the acquisition instruction of apparatus status information to the agent unit 111 (in Step S13).

In this occasion, if the apparatus status information on the image forming apparatus 101 is not received from the agent unit 111, for example, within a specific time due to power-off status of the image forming apparatus 101, then the schedule managing unit 43 determines that the agent units 111 failed in the acquisition of the apparatus status information on the image forming apparatus 101 (in Step S14).

If the agent units 111 failed in the acquisition of the apparatus status information on the image forming apparatus 101, then the schedule managing unit 43 outputs an acquisition failure notification on this acquisition and the registered operation schedule information on the image forming apparatus 101 to the service terminal apparatus 3 (in Step S15). Upon receiving the acquisition failure notification, the service terminal apparatus 3 displays a message that indicates the acquisition failure and the operation schedule based on the received operation schedule information.

A user (e.g. the service person) confirms the message and the operation schedule and decides whether the user abandons acquisition of the apparatus status information or not. If the user does not abandon acquisition of the apparatus status information, then the user decides a timing to try acquisition of the apparatus status information again with taking into account an operation period of the image forming apparatus 101 in the operation schedule, and performs an operation for specifying the timing to the service terminal apparatus 3.

Upon receiving the operation, the service terminal apparatus 3 outputs an acquisition scheduling request to the remote maintenance server 1 for scheduling retransmission of the acquisition instruction at the specified timing (in Step S16).

In the remote maintenance server 1, upon receiving the acquisition scheduling request using the communication processing unit 41 and the communicating unit 31, the schedule managing unit 43 sets the specified timing to a timer (in Step S17). Afterward, at the timing, the schedule managing unit 43 transmits the acquisition instruction to the agent unit 111 again.

If the agent units 111 succeeded in the acquisition of the apparatus status information, in the remote maintenance server 1, the data managing unit 42 stores the apparatus status information so as to be related to the image forming apparatus 101, and outputs the apparatus status information to the service terminal apparatus 3 as a response to a request received from the service terminal apparatus 3. The service terminal apparatus 3 outputs a request of the apparatus status information to the remote maintenance server 1 in accordance with an operation by the service person, receives the apparatus status information as a response to the request, and displays the apparatus status information. Consequently, the remote service person can confirm the apparatus status information on the image forming apparatus 101.

In the aforementioned Embodiment 1, the agent unit 111 or 211 acquires apparatus status information that indicates a current status of the image forming apparatus 101 or 201 from the image forming apparatus 101 or 201. The remote maintenance server 1 transmits an acquisition instruction of apparatus status information to the agent unit 111 or 211. If the agent units 111 or 211 succeeded in the acquisition of the apparatus status information, the remote maintenance server 1 receives the apparatus status information from the agent unit 111 or 211. Further, the remote maintenance server 1 (a) acquires operation schedule information on the image forming apparatus 101 or 201, (b) transmits an acquisition instruction of the apparatus status information to the agent unit 111 or 211, (c) registers a retransmission schedule of the acquisition instruction so as to transmit the acquisition instruction at a timing within an operation period of the image forming apparatus 101 or 201 determined from the operation schedule if the agent units 111 or 211 failed in acquisition of the apparatus status information, and (d) transmits the acquisition instruction to the agent unit 111 or 211 at the timing of the retransmission schedule.

Consequently, the maintenance service provider side can acquire respective pieces of apparatus status information on the image forming apparatuses 101 and 201 with taking into account operation schedules that are different from each other in respective organizations. Therefore, apparatus status information is acquired from the image forming apparatus 101 or 201 as an electronic apparatus at high possibility, and the image forming apparatus 101 or 201 can be managed smoothly.

Embodiment 2

A basic configuration of an apparatus management system in Embodiment 2 is the same as the basic configuration of an apparatus management system in Embodiment 1. However, in Embodiment 2, the remote maintenance server 1 automatically set an acquisition timing of apparatus status information on the image forming apparatus 101 or 201 on the basis of operation schedule information on the image forming apparatus 101 or 201.

In the following part, an apparatus management process in Embodiment 2 is explained.

Figure 5:
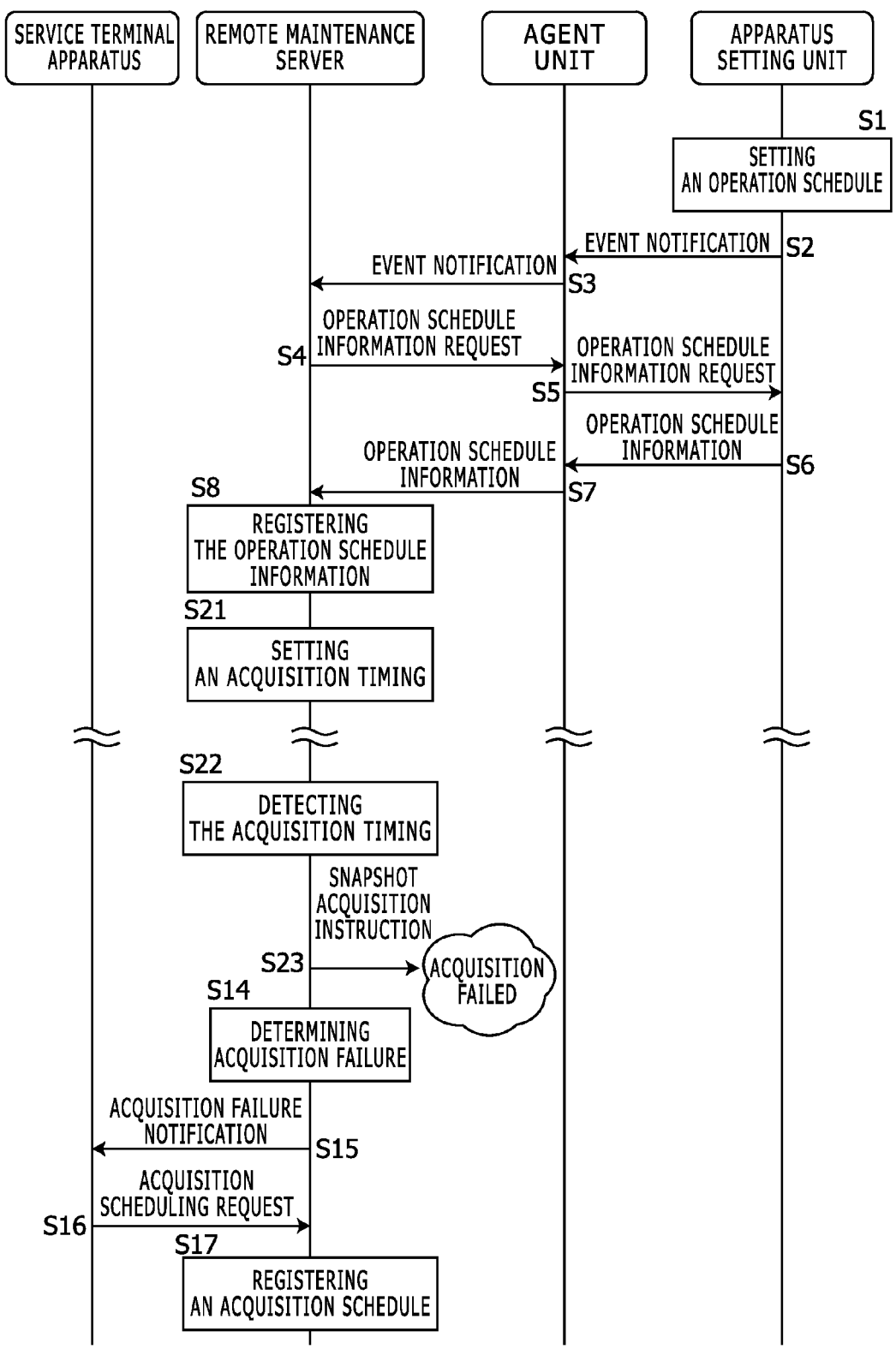
FIG. 5 shows an apparatus management process in Embodiment 2.

FIG. 5 shows an apparatus management process in Embodiment 2. Management of the image forming apparatus 101 using the agent unit 111 is explained here, and management of the image forming apparatus 201 is also performed in the same manner using the agent unit 211.

In Embodiment 2, when registering the received operation schedule information (in Step S8), the schedule managing unit 43 in the remote maintenance server 1 determines an operation period of the image forming apparatus 101 on the basis of the operation schedule information, and automatically sets a timing within the operation period (for example, the earliest timing within the operation period) as the acquisition timing of apparatus status information on the image forming apparatus 101 (in Step S21).

Therefore, every time when the apparatus setting of an operation schedule is changed in the image forming apparatus 101, the operation schedule information of the image forming apparatus 101 stored in the remote maintenance server 1 is updated and an acquisition timing of the operation schedule information is also changed.

When detecting that the acquisition timing comes (in Step S22), the schedule managing unit 43 transmits an acquisition instruction of apparatus status information to the agent unit 111 using the communication processing unit 41 and the communicating unit 31 (in Step S23).

If the agent units 111 failed in the acquisition of the apparatus status information on the image forming apparatus 101, then the schedule managing unit 43 and the service terminal apparatus 3 perform the same processes as those in Embodiment 1 (in Steps S15 to S17).

In the aforementioned Embodiment 2, the remote maintenance server 1 automatically sets acquisition timings of apparatus status information on the image forming apparatuses 101 and 201 with taking into account operation schedules that are different from each other in respective organizations. Therefore, apparatus status information is acquired from the image forming apparatus 101 or 201 as an electronic apparatus at high possibility, and the image forming apparatus 101 or 201 can be managed smoothly.

Embodiment 3

A system according to Embodiment 3 of the present disclosure basically has the same configuration as that of the system according to Embodiment 1 or 2, but has a different point as follows.

In Embodiment 3, on the basis of an instruction from the service terminal apparatus 3 that a service person operates, the schedule managing unit 43 (a) transmits transmission schedule information on transmission of apparatus status information to the agent unit 111 or 211 corresponding to the image forming apparatus 101 or 201 as an object from which apparatus status information is acquired, and (b) receives a notification of a transmission timing from the agent unit 111 or 211 and informs the transmission timing to the service terminal apparatus 3. The transmission timing is determined on the basis of both the transmission schedule information and an operation schedule of the image forming apparatus 101 or 201.

Further, the schedule managing unit 43 receives apparatus status information from the agent unit 111 or 211 using the communicating unit 31 and the communication processing unit 41. The received apparatus status information is stored so as to be related to identification information on the image forming apparatus by the data managing unit 42, and the data managing unit 42 transmits the stored apparatus status information to the service terminal apparatus 3 as a response to a request received from the service terminal apparatus 3 on the maintenance service provider side.

The operation schedule information may include operating day calendar information on an organization that uses the image forming apparatus 101 or 201. Such operating day calendar information may be imported to the image forming apparatus 101 or 201 by an administrator of the image forming apparatus 101 or 201 or may be downloaded through the network 2 from a server of the organization by the schedule managing unit 43.

In the following part, an apparatus management process in Embodiment 3 is explained.

Figure 6:
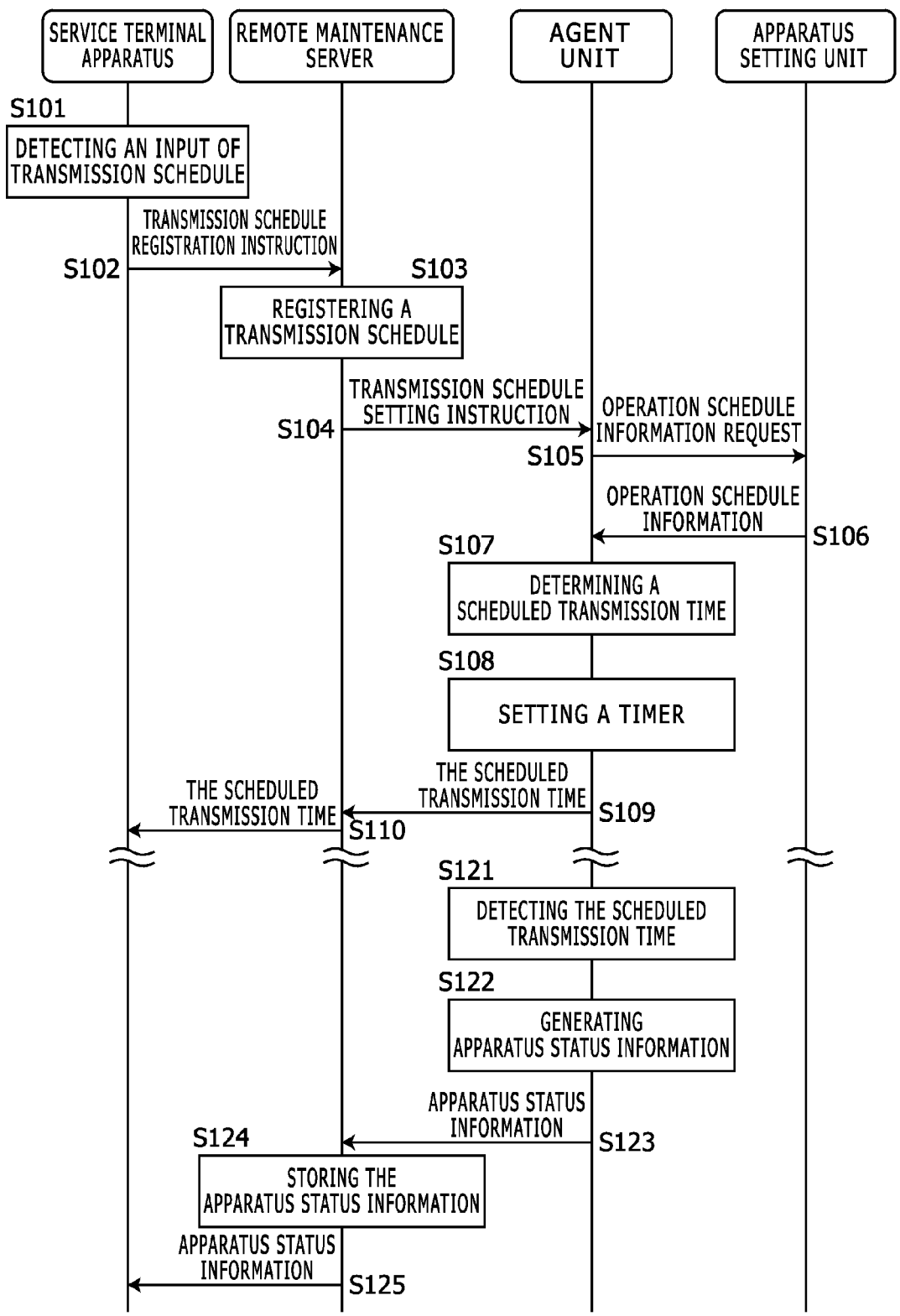
FIG. 6 shows an apparatus management process in Embodiment 3.

FIG. 6 shows an apparatus management process in Embodiment 3. Management of the image forming apparatus 101 using the agent unit 111 is explained here, and management of the image forming apparatus 201 is also performed in the same manner using the agent unit 211.

Upon detecting an operation by a service person on the center side to input transmission schedule information of apparatus status information on the image forming apparatus 101 (in Step S101), the service terminal apparatus 3 outputs the transmission schedule information to the remote maintenance server 1 with a transmission schedule registration instruction (in Step S102). For example, the transmission schedule information specifies periodical transmission timings such as daily cycle, weekly cycle or monthly cycle.

In the remote maintenance server 1, receiving the transmission schedule registration instruction and the transmission schedule information, the schedule managing unit 43 registers the received transmission schedule information so as to be related to the image forming apparatus 101 (in Step S103).

The remote maintenance server 1 may be configured to store default transmission information and use the default transmission information.

Further, the schedule managing unit 43 transmits a transmission schedule setting instruction to the agent unit 111 with the transmission schedule information (in Step S104).

If the agent unit 111 is off line, the schedule managing unit 43 will transmit the transmission schedule setting instruction with the transmission schedule information when the agent unit 111 becomes on line afterward.

Upon receiving the transmission schedule setting instruction and the transmission schedule information, the agent unit 111 requests currently set operation schedule information from the apparatus setting unit 24 of the image forming apparatus 101 (in Step S105), and acquires the operation schedule information (in Step S106).

Subsequently, as mentioned, the agent unit 111 determines a scheduled transmission timing on the basis of the transmission schedule information and the operation schedule information in the aforementioned manner (in Step S107), and sets the scheduled transmission timing to an unshown timer (in Step S108), and informs the scheduled transmission timing to the remote maintenance server 1 (in Step S109).

In the remote maintenance server 1, upon receiving information on the scheduled transmission timing, the schedule managing unit 43 informs the scheduled transmission timing to the service terminal apparatus 3 (in Step S110). The service terminal apparatus 3 displays the scheduled transmission timing for the service person.

Afterward, when detecting that the scheduled transmission timing comes using the timer (in Step S121), the agent unit 111 generates apparatus status information on the image forming apparatus 101 (in Step S122), and transmits the apparatus status information to the remote maintenance server 1 (in Step S123).

In the remote maintenance server 1, the apparatus status information is received and stored by the data managing unit 42 (in Step S124). Afterward, for example, at the informed scheduled transmission timing or later, upon receiving an operation by a service person, the service terminal apparatus 3 acquires the apparatus status information from the remote maintenance server 1 (in Step S125), and displays the apparatus status information for the service person.

In the aforementioned manner, with taking into account the operation schedule of the image forming apparatus, apparatus status information on the image forming apparatus 101 is transmitted to the remote maintenance server 1 and stored therein at regular intervals according to the transmission schedule specified by the maintenance service provider side.

Figure 7:
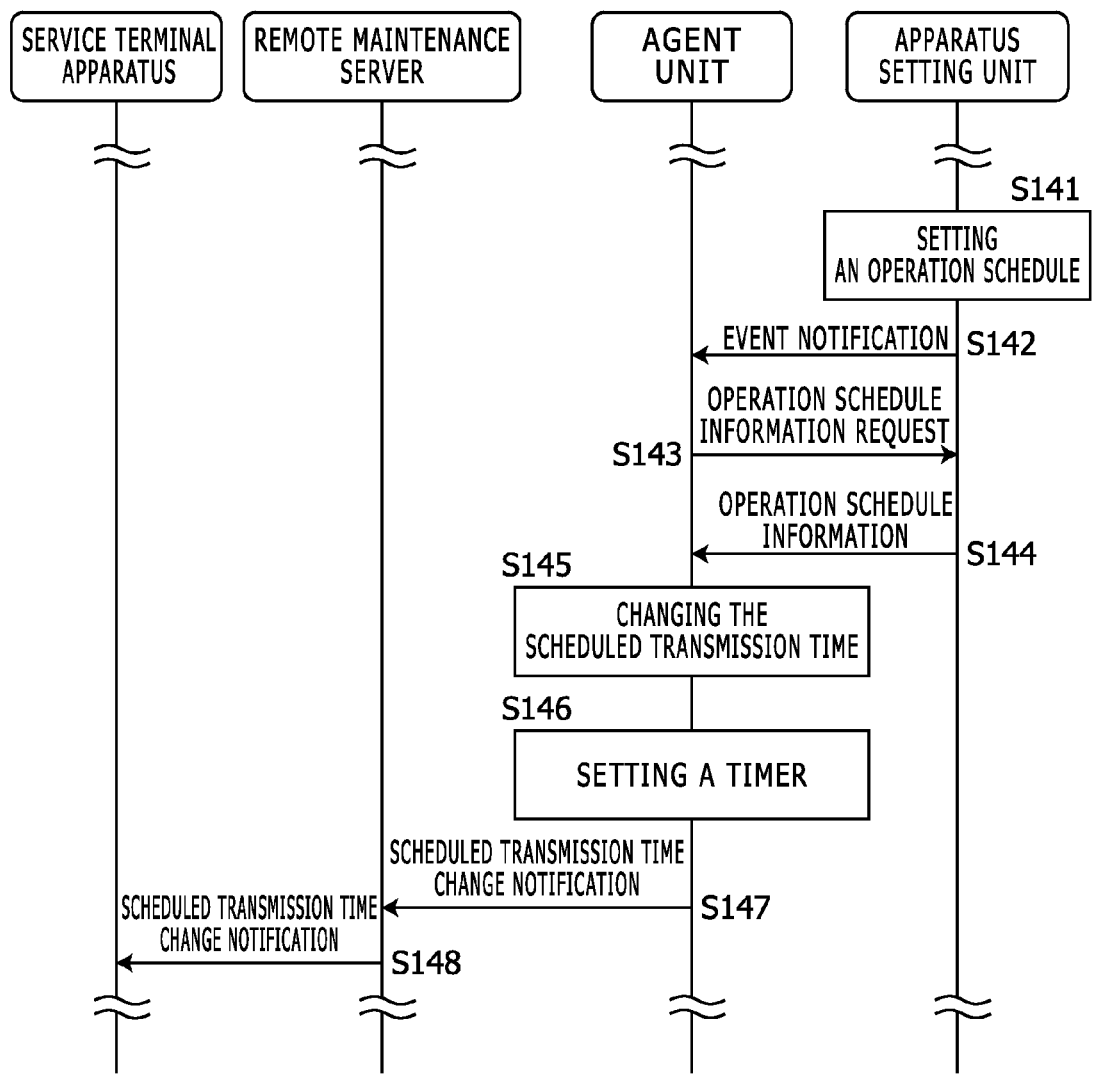
FIG. 7 shows an apparatus management process (a process in a case that an operation schedule was changed after a transmission timing was settled) in Embodiment 3.

Here explained is a process in a case that the operation schedule was changed after the transmission timing was settled. FIG. 7 shows an apparatus management process (a process in a case that an operation schedule was changed after a transmission timing was settled) in Embodiment 3.

When an end user inputs operation schedule information to newly set or change an operation schedule by operating the operation panel 11 of the image forming apparatus 101, the apparatus setting unit 24 registers the operation schedule as an apparatus setting in the image forming apparatus 101 (in Step S141). When registering the apparatus setting on the operation schedule, the apparatus setting unit 24 outputs an event notification to the agent unit 111 (in Step S142). This event notification indicates that addition and/or change occurred of the apparatus setting on the operation schedule.

Upon receiving this event notification, the agent unit 111 requests an apparatus setting on operation schedule from the apparatus setting unit 24 (in Step S143), and acquires the apparatus setting on operation schedule as operation schedule information (in Step S144).

Subsequently, the agent unit 111 determines whether the scheduled transmission timing of the apparatus status information should be changed or not on the basis of the acquired operation schedule information.

If it is determined that the scheduled transmission timing of the apparatus status information should be changed, then the agent unit 111 changes the scheduled transmission timing (in Step S145), and sets the changed scheduled transmission timing to the timer (in Step S146).

For example, if the agent unit 111 confirms that the image forming apparatus 101 will be out of operation at the currently scheduled transmission timing on the basis of the acquired operation schedule information, then the agent unit 111 determines that the scheduled transmission timing of the apparatus status information should be changed.

When changing the scheduled transmission timing of the apparatus status information, the agent unit 111 changes the scheduled transmission timing to a timing earlier than the original scheduled transmission timing.

If the scheduled transmission timing was changed, the agent unit 111 transmits a scheduled transmission timing change notification that indicates the changed scheduled transmission timing to the remote maintenance server 1 (in Step S147).

In the remote maintenance server 1, the schedule managing unit 43 receives the scheduled transmission timing change notification, and informs the changed scheduled transmission timing to the service terminal apparatus 3, for example, at a timing when a service person logs in the service terminal apparatus 3 (in Step S148). The service terminal apparatus 3 displays the scheduled transmission timing for the service person.

In the aforementioned manner, when the operation schedule of the image forming apparatus 101 is changed on an end user side, the scheduled transmission timing of apparatus status information on the image forming apparatus 101 is properly changed with taking into account the changed operation schedule.

In the aforementioned Embodiment 3, the image forming apparatus 101 and the terminal apparatus 202 include agent units 111 and 211, respectively. The agent unit 111 or 211 transmits apparatus status information that indicates a status of the image forming apparatus 101 or 201 to the remote maintenance server 1. Further, the agent unit 111 or 211 (*a*) receives transmission schedule information on the apparatus status information from the remote maintenance server 1, (b) acquires operation schedule information on the image forming apparatus 101 or 201 set in the image forming apparatus 101 or 201, (c) determines a transmission timing of the apparatus status information on the basis of both the transmission schedule information and the operation schedule information, and (d) transmits the apparatus status information to the remote maintenance server 1 at the transmission timing.

Therefore, in accordance with a transmission schedule set by the maintenance service provider side, apparatus status information is periodically acquired from the image forming apparatus 101 or 201 at high possibility, and the image forming apparatus 101 or 201 can be managed smoothly.

Embodiment 4

A system according to Embodiment 4 of the present disclosure basically has the same configuration as that of the system according to Embodiment 1 2 or 3, but has a different point as follows.

In Embodiment 4, the schedule managing unit 43 (a) acquires operation schedule information on the image forming apparatus 101 or 201, and (b) performs warning notification to the service terminal apparatus 3 if a transmission timing of the acquisition instruction of the apparatus status information specified by the service terminal apparatus 3 is out of an operation period determined from the operation schedule information.

In Embodiment 4, the schedule managing unit 43 receives a transmission timing setting instruction of the acquisition instruction from the service terminal apparatus 3. If a transmission timing set with the transmission timing setting instruction is out of an operation period determined from the operation schedule information, the schedule managing unit 43 performs warning notification to the service terminal apparatus 3 immediately upon receiving the transmission timing setting instruction. If a transmission timing set with the transmission timing setting instruction is within an operation period determined from the operation schedule information, the schedule managing unit 43 sets the transmission timing to an unshown timer and transmits an acquisition instruction of apparatus status information to the agent unit 111 or 211 at the transmission timing.

Further, the schedule managing unit 43 outputs the operation schedule information to the service terminal apparatus 3 with the warning notification. The service terminal apparatus 3 displays the operation schedule information with the warning notification for the service person.

The operation schedule information may include operating day calendar information on an organization that uses the image forming apparatus 101 or 201. Such operating day calendar information may be imported to the image forming apparatus 101 or 201 by an administrator of the image forming apparatus 101 or 201 or may be downloaded through the network 2 from a server of the organization by the schedule managing unit 43. Further, the operation schedule information may include an operation period of the image forming apparatus 101 or 201 automatically determined from a power-on operation and a power-off operation determined in an event log of the image forming apparatus 101 or 201.

In the following part, an apparatus management process in Embodiment 4 is explained.

Figure 8:
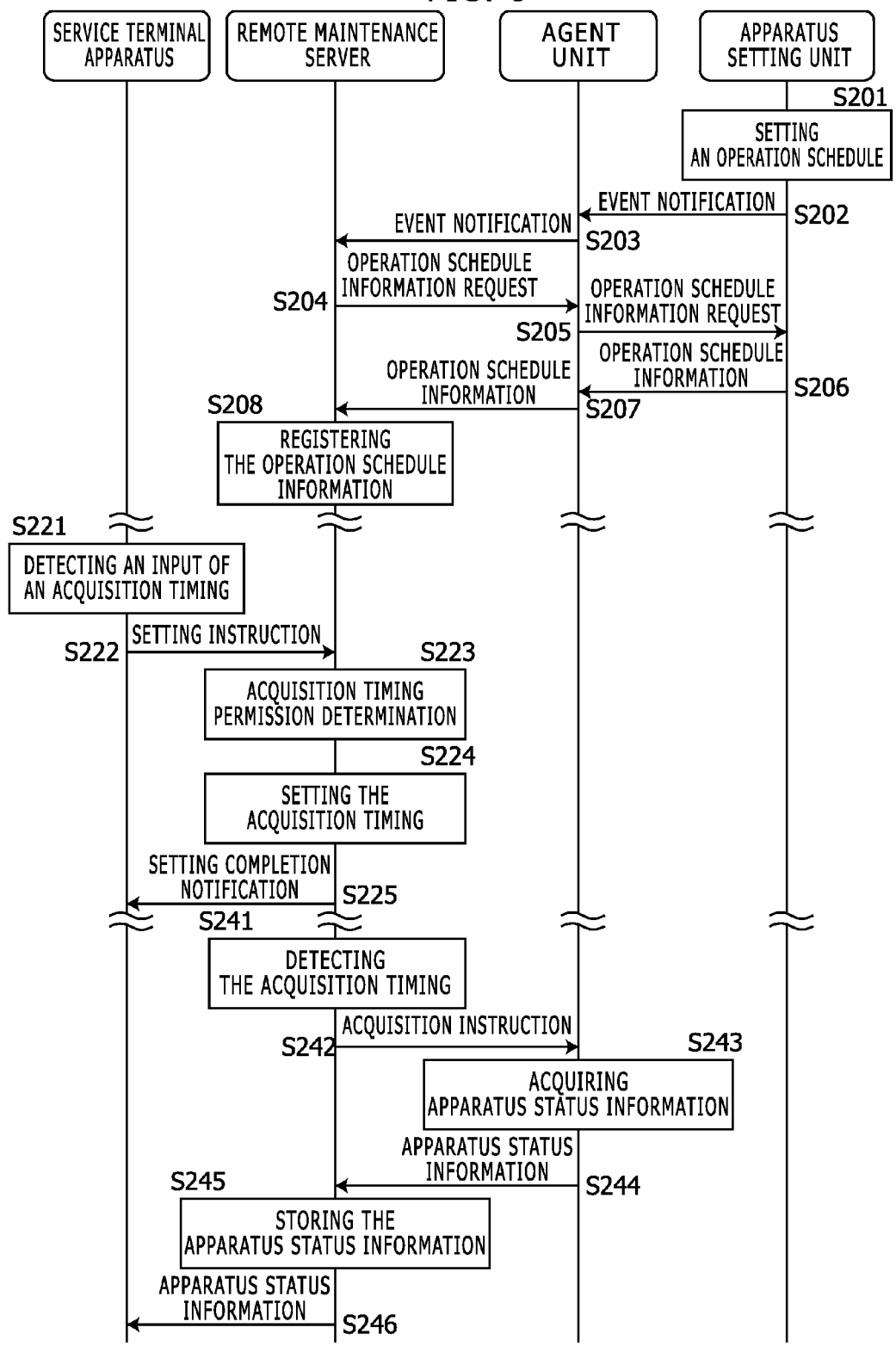
FIG. 8 shows an apparatus management process in Embodiment 4 (1/3)
Figure 9:
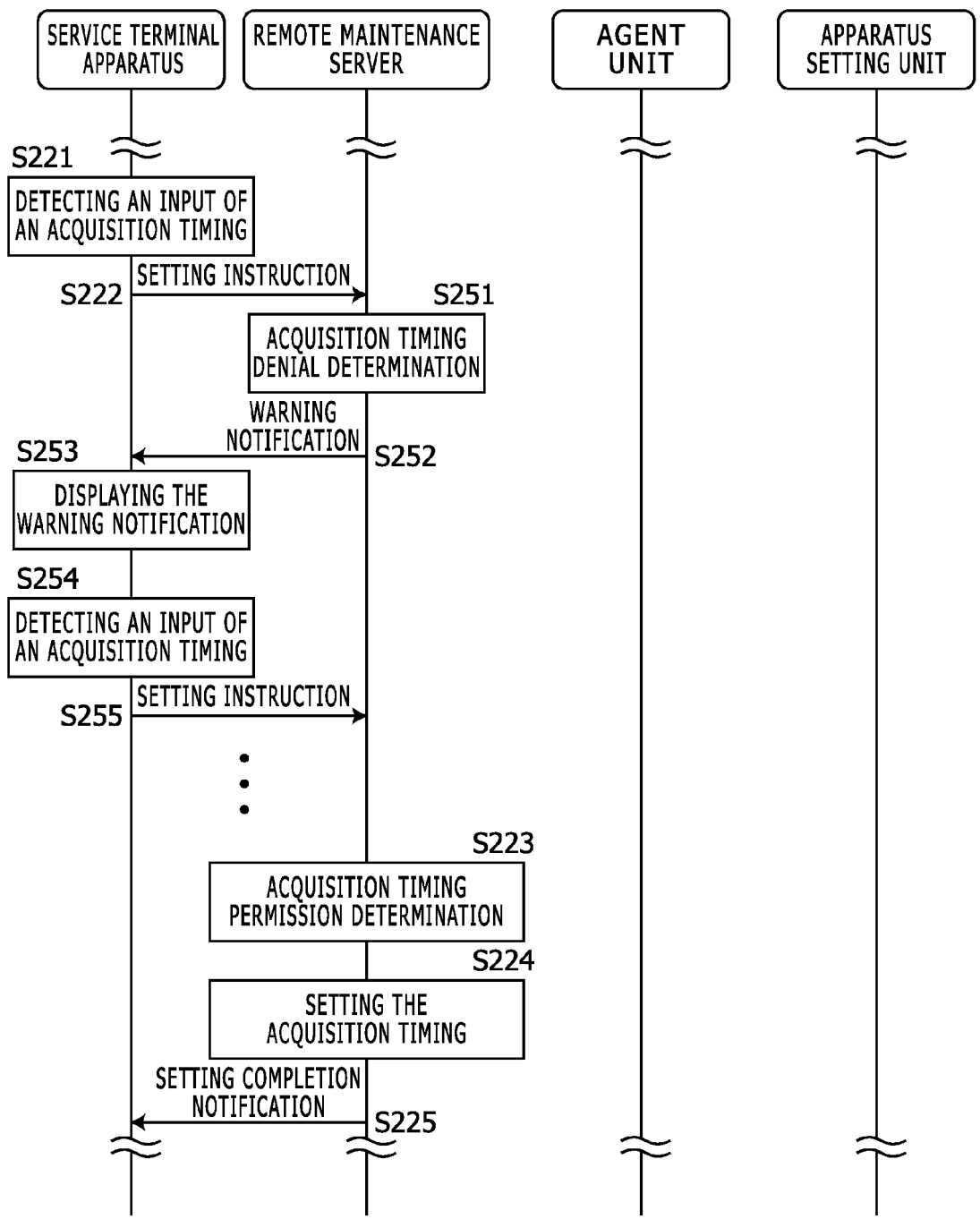
FIG. 9 shows an apparatus management process in Embodiment 4 (2/3)
Figure 10:
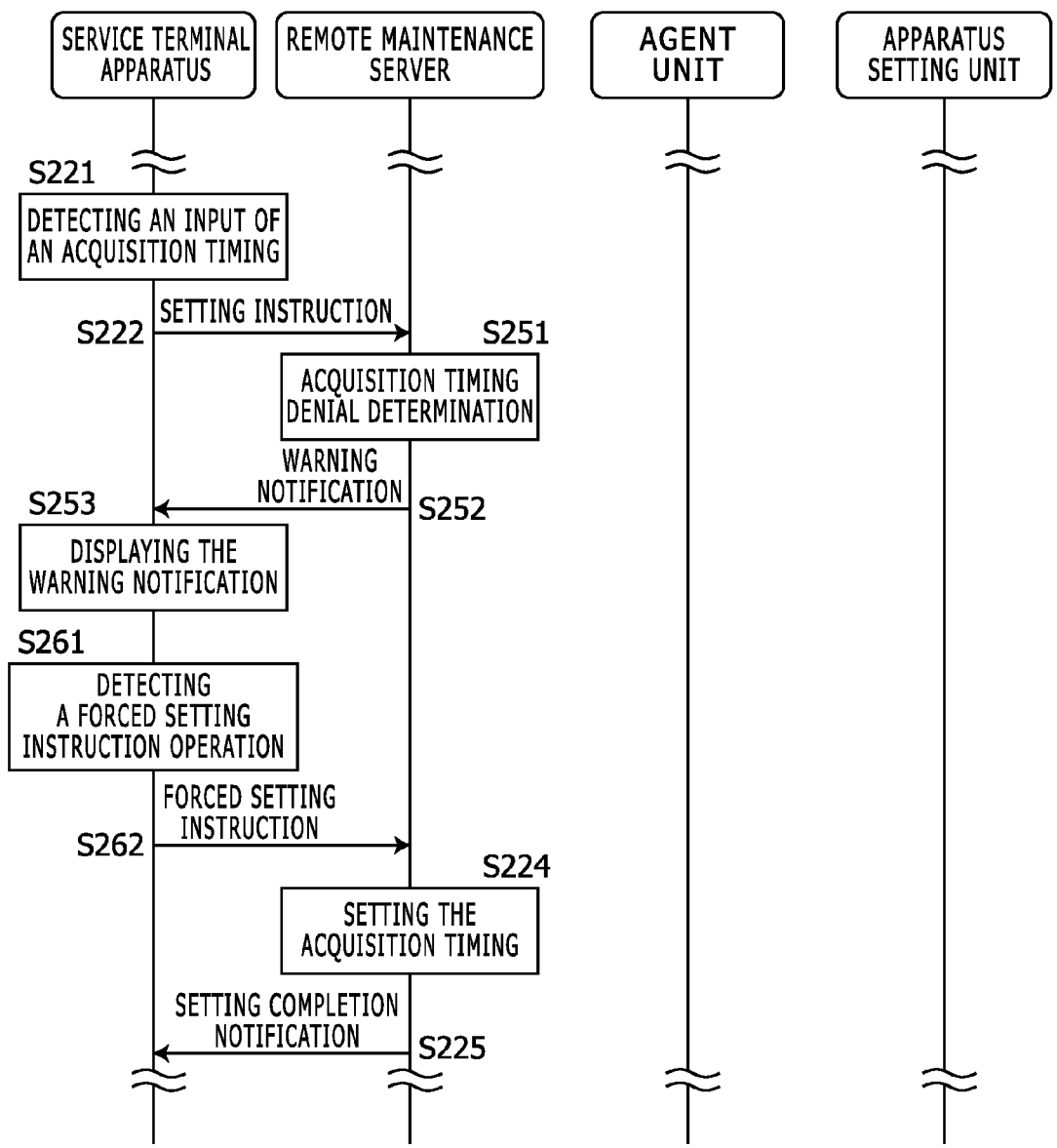
FIG. 10 shows an apparatus management process in Embodiment 4 (3/3)

FIG. 8, FIG. 9 and FIG. 10 show an apparatus management process in Embodiment 4. Management of the image forming apparatus 101 using the agent unit 111 is explained here, and management of the image forming apparatus 201 is also performed in the same manner using the agent unit 211.

When an end user inputs operation schedule information to newly set or change an operation schedule by operating the operation panel 11 of the image forming apparatus 101, the apparatus setting unit 24 registers the operation schedule as an apparatus setting in the image forming apparatus 101 (in Step S201). When registering the apparatus setting on the operation schedule, the apparatus setting unit 24 outputs an event notification to the agent unit 111 (in Step S202). This event notification indicates that addition and/or change occurred of the apparatus setting on the operation schedule.

Upon receiving this event notification, the agent unit 111 transmits the event notification to the remote maintenance server 1 through the network 2 using the communication device 15 (in Step S203).

In the remote maintenance server 1, the schedule managing unit 43 receives the event notification using the communication processing unit 41 and the communicating unit 31, and transmits an operation schedule information request to the agent unit 111, that is, the sender of the received event notification (in Step S204).

Upon receiving the request, the agent unit 111 acquires an apparatus setting on operation schedule (in Steps S205 and S206), and transmits the acquired apparatus setting as operation schedule information to the remote maintenance server 1 through the network 2 using the communication device 15 (in Step S207).

In the remote maintenance server 1, the schedule managing unit 43 receives the operation schedule information using the communication processing unit 41 and the communicating unit 31 and stores the received operation schedule information so as to be related to identification information on the image forming apparatus 101 (in Step S208).

Every time when the operation schedule of the image forming apparatus is added or changed, in the remote maintenance server 1, the schedule managing unit 43 stores the operation schedule information and consequently, the operation schedule information of the image forming apparatus 101 is updated.

On the other hand, when a service person performs an operation to the service terminal apparatus 3 for a setting instruction of an acquisition timing of apparatus status information on the image forming apparatus 101, the service terminal apparatus 3 detects this operation (in Step S221), and outputs the setting instruction of an acquisition timing of apparatus status information on the image forming apparatus 101 to the remote maintenance server 1 (in Step S222).

In the remote maintenance server 1, upon receiving the setting instruction using the communication processing unit 41 and the communicating unit 31, the schedule managing unit 43 immediately refers to the operation schedule information on the image forming apparatus 101, and determines whether the acquisition timing specified by the setting instruction is within an operation period determined from the operation schedule information or not.

If the schedule managing unit 43 determines that the acquisition timing is within the operation period determined from the operation schedule information on the image forming apparatus 101 as shown in FIG. 8 (in Step S223), then the schedule managing unit 43 sets the acquisition timing to an unshown timer (in Step S224), and output a setting completion notification that indicates the set acquisition timing to the service terminal apparatus 3 (in Step S225). Upon receiving the setting completion notification, the service terminal apparatus 3 displays a setting completion message and the set acquisition timing for the service person.

Afterward, when the schedule managing unit 43 detects that the acquisition timing comes using the timer (in Step S241), the schedule managing unit 43 transmits an acquisition instruction of apparatus status information to the agent unit 111 (in Step S242).

In this case, since the acquisition timing is within an operation period determined from the operation schedule information on the image forming apparatus 101, the agent units 111 succeeds in acquisition of the apparatus status information at high possibility. If the agent unit 111 succeeds the acquisition of apparatus status information on the image forming apparatus 101 (in Step S243), the agent unit 111 transmits the apparatus status information to the remote maintenance server 1 (in Step S244).

In the remote maintenance server 1, upon receiving the apparatus status information, the data managing unit 42 stores the apparatus status information (in Step S245), and afterward, outputs the stored apparatus status information to the service terminal apparatus 3 as a response to a reading request received from the service terminal apparatus that a service person operates (in Step S246). Upon receiving the apparatus status information, the service terminal apparatus 3 displays the apparatus status information for the service person.

On the other hand, as shown in FIG. 9 and FIG. 10, if the schedule managing unit 43 determines that the acquisition timing is out of an operation period determined from the operation schedule information on the image forming apparatus 101 (in Step S251), the schedule managing unit 43 outputs a warning notification to the service terminal apparatus 3 without setting the acquisition timing to the timer (in Step S252). This warning notification indicates setting denial and that the specified acquisition timing is out of the operation period. Upon receiving the warning notification, the service terminal apparatus 3 displays a warning message for the service person (in Step S253).

Subsequently, the service person chooses one of three options: abandonment of setting the acquisition timing, retry setting of another acquisition timing, and forced setting of the original acquisition timing.

If the service person chooses retry setting of another acquisition timing, the service person performs an operation to input another acquisition timing. In this case, as shown in FIG. 9, upon detecting this operation (in Step S254), the service terminal apparatus 3 outputs a setting instruction of the inputted acquisition timing of apparatus status information on the image forming apparatus 101 to the remote maintenance server 1 (in Step S255).

If the service person chooses forced setting of the original acquisition timing, the service person performs a forced setting instruction operation. In this case, as shown in FIG. 10, upon detecting this operation (in Step S261), the service terminal apparatus 3 outputs a forced setting instruction to the remote maintenance server 1 (in Step S262). In the remote maintenance server 1, upon receiving the forced setting instruction, the schedule managing unit 43 sets the acquisition timing (out of the operation period) specified by the original setting instruction to a timer (in Step S224), and outputs a setting completion notification that indicates the set acquisition timing to the service terminal apparatus (in Step S225). Upon receiving the setting completion notification, the service terminal apparatus 3 displays a setting completion message and the set acquisition timing for the service person.

In the aforementioned Embodiment 4, the agent unit 111 or 211 acquires apparatus status information that indicates a status of the image forming apparatus 101 or 201 from the image forming apparatus 101 or 201. The remote maintenance server 1 (a) acquires operation schedule information on the image forming apparatus 101 or 201, and (b) performs warning notification to the service terminal apparatus 3 if a transmission timing of the acquisition instruction of the apparatus status information specified by the service terminal apparatus 3 is out of an operation period determined from the operation schedule information.

Therefore, at a timing specified by the maintenance service provider side, apparatus status information is acquired from the image forming apparatus 101 or 201 at high possibility, and the image forming apparatus 101 or 201 can be managed smoothly.

Embodiment 5

In Embodiment 4, the service terminal apparatus 3 that a service person operates sets an acquisition timing of apparatus status information to the remote maintenance server 1. Alternatively, in Embodiment 5, upon receiving acquisition instruction of apparatus status information from the service terminal apparatus 3 that a service person operates, the remote maintenance server 1 transmits an acquisition instruction of apparatus status information to the agent unit 111 or 211 in accordance with the acquisition instruction.

A basic configuration of an apparatus management system in Embodiment 5 is the same as the basic configuration of an apparatus management system in Embodiment 4. The remote maintenance server 1 and the service terminal apparatus 3 in Embodiment 5 run in the following manner.

In Embodiment 5, the schedule managing unit 43 receives an acquisition instruction of apparatus status information from the service terminal apparatus 3. If a timing when the acquisition instruction of apparatus status information was received from the service terminal apparatus is out of an operation period determined from the operation schedule information, then the schedule managing unit 43 immediately performs warning notification to the service terminal apparatus 3. If the timing when the acquisition instruction of apparatus status information was received from the service terminal apparatus 3 is within an operation period determined from the operation schedule information, then the schedule managing unit 43 transmits an acquisition instruction of apparatus status information to the agent unit 111 or 211.

In the following part, an apparatus management process in Embodiment 5 is explained.

Figure 11:
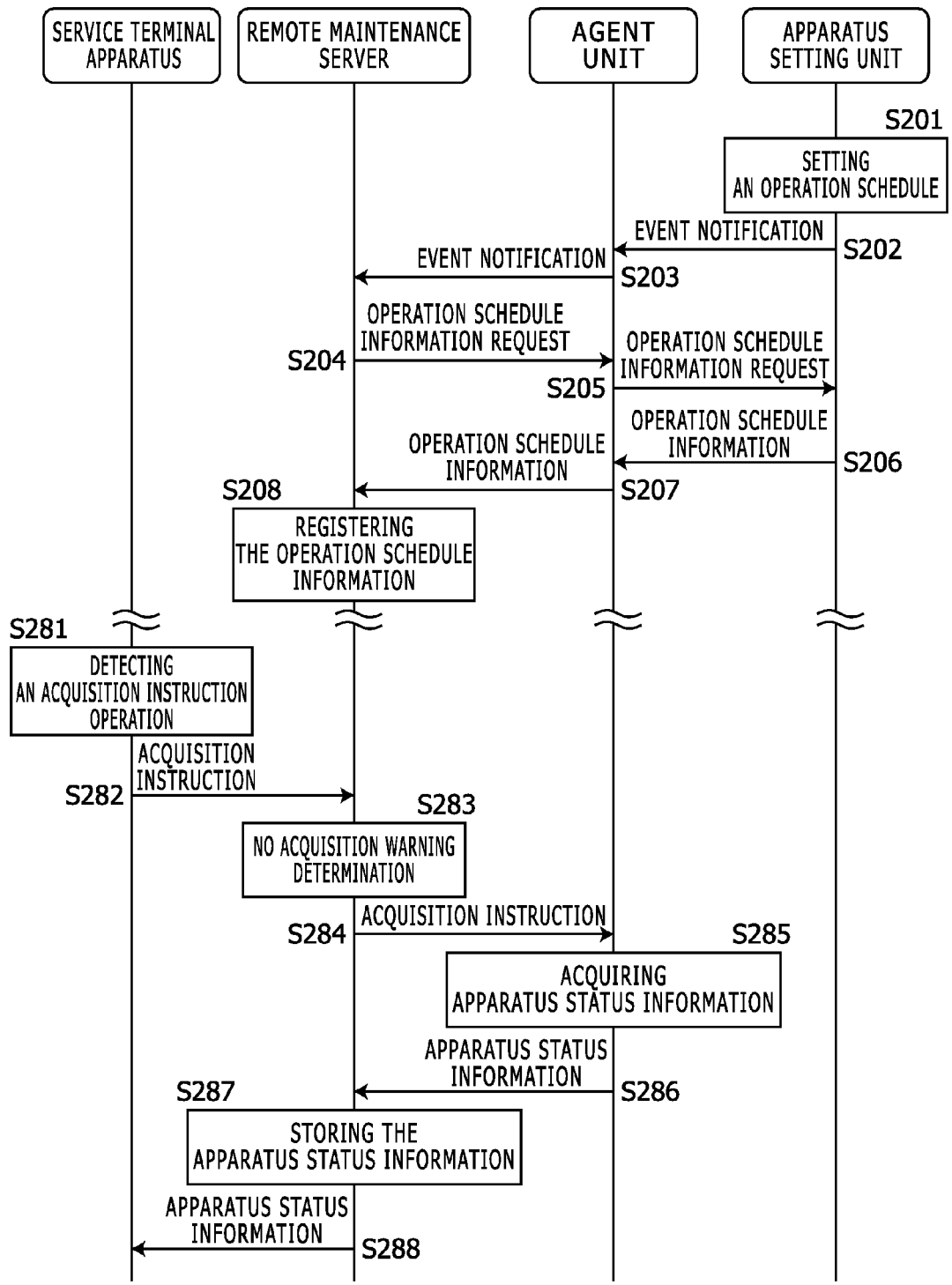
FIG. 11 shows an apparatus management process in Embodiment 5 (1/2)
Figure 12:
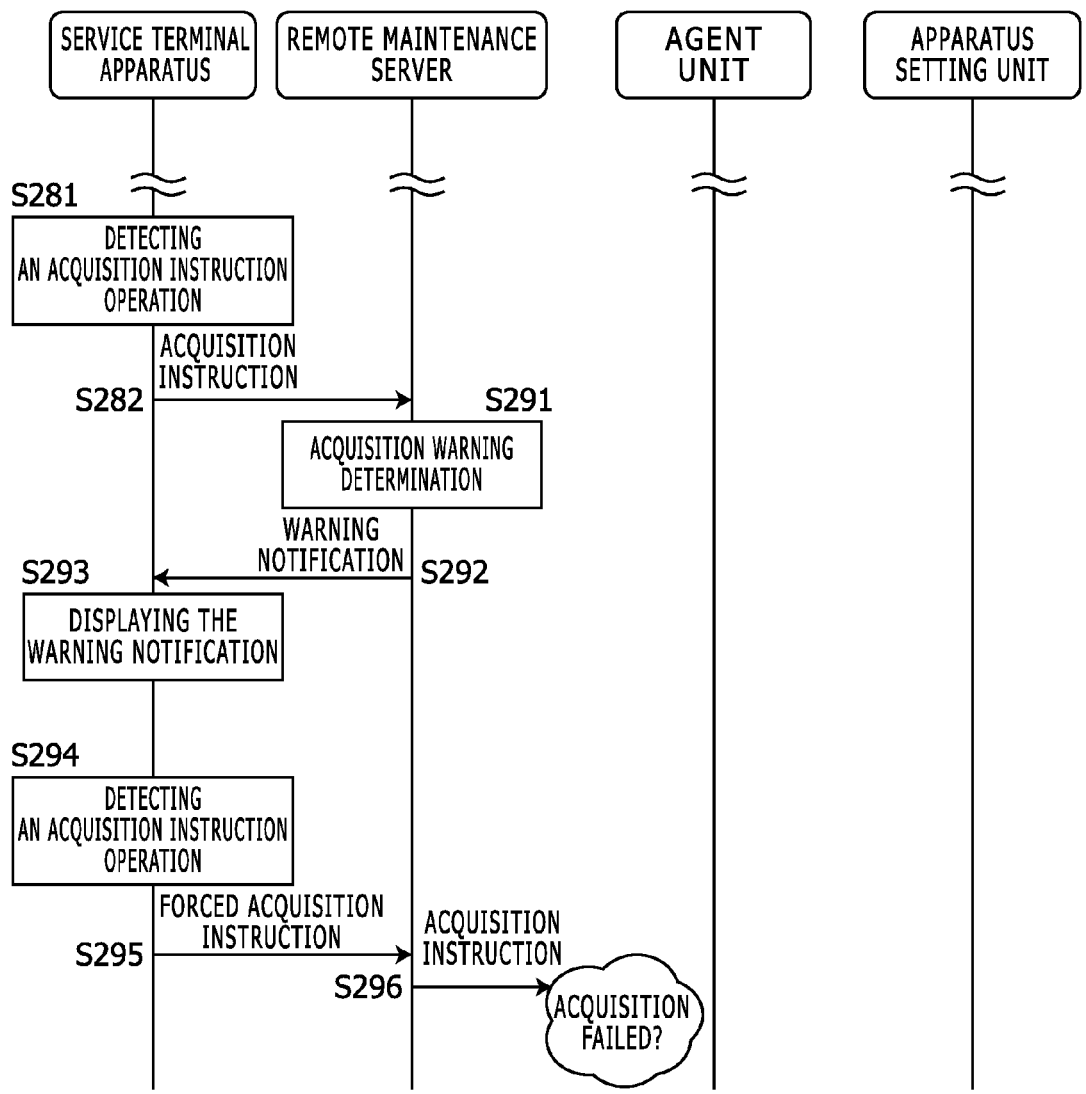
FIG. 12 shows an apparatus management process in Embodiment 5 (2/2).

FIG. 11 and FIG. 12 show an apparatus management process in Embodiment 5. Management of the image forming apparatus 101 using the agent unit 111 is explained here, and management of the image forming apparatus 201 is also performed in the same manner using the agent unit 211.

In Embodiment 5, as well as Embodiment 4, the operation schedule information on the image forming apparatus 101 is registered in the remote maintenance server 1 (in Steps S201 to S208).

On the other hand, when a service person performs an acquisition instruction operation of apparatus status information on the image forming apparatus 101 to the service terminal apparatus 3, the service terminal apparatus 3 detects this operation (in Step S281), and outputs the acquisition instruction of apparatus status information on the image forming apparatus 101 to the remote maintenance server 1 (in Step S282).

In the remote maintenance server 1, upon receiving the acquisition instruction using the communication processing unit 41 and the communicating unit 31, the schedule managing unit 43 immediately refers to the operation schedule information on the image forming apparatus 101, and determines whether the current time is within an operation period determined from the operation schedule information or not.

As shown in FIG. 11, if the schedule managing unit 43 determines that the current time is within an operation period determined from the operation schedule information (in Step S283), then the schedule managing unit 43 transmits an acquisition instruction of apparatus status information to the agent unit 111 (in Step S284).

In this case, since the acquisition timing is within an operation period determined from the operation schedule information on the image forming apparatus 101, the agent units 111 succeeds in acquisition of the apparatus status information at high possibility. If the agent unit 111 succeeds the acquisition of apparatus status information on the image forming apparatus 101 (in Step S285), the agent unit 111 transmits the apparatus status information to the remote maintenance server 1 (in Step S286).

In the remote maintenance server 1, upon receiving the apparatus status information, the data managing unit 42 stores the apparatus status information (in Step S287), and afterward, outputs the stored apparatus status information to the service terminal apparatus 3 as a response to a reading request received from the service terminal apparatus that a service person operates (in Step S288). Upon receiving the apparatus status information, the service terminal apparatus 3 displays the apparatus status information for the service person.

On the other hand, as shown in FIG. 12, if the schedule managing unit 43 determines that the current time is out of an operation period determined from the operation schedule information on the image forming apparatus 101 (in Step S291), then the schedule managing unit 43 outputs a warning notification to the service terminal apparatus 3 without transmitting an acquisition instruction (in Step S292). This warning notification indicates transmission denial and that the current time is out of the operation period. Upon receiving the warning notification, the service terminal apparatus 3 displays the warning notification for the service person (in Step S293).

Subsequently, the service person chooses one of two options: abandonment of acquisition at this time and forced acquisition at this time.

If the service person chooses forced acquisition at this time, the service person performs a forced acquisition instruction operation. In this case, as shown in FIG. 12, upon detecting this operation (in Step S294), the service terminal apparatus 3 outputs a forced acquisition instruction to the remote maintenance server 1 (in Step S295).

In the remote maintenance server 1, upon receiving the forced acquisition instruction, the schedule managing unit 43 transmits an acquisition instruction of apparatus status information to the agent unit 111 (in Step S296). In this case, the acquisition fails at high possibility, but if the apparatus status information is received from the agent unit 111, the data managing unit 42 stores the apparatus status information, and afterward, outputs the stored apparatus status information to the service terminal apparatus 3 as a response to a reading request received from the service terminal apparatus 3 that a service person operates. Upon receiving the apparatus status information, the service terminal apparatus 3 displays the apparatus status information for the service person.

In the aforementioned Embodiment 5, the agent unit 111 or 211 acquires apparatus status information that indicates a status of the image forming apparatus 101 or 201 from the image forming apparatus 101 or 201. The remote maintenance server 1 (a) acquires operation schedule information on the image forming apparatus 101 or 201, and (b) performs warning notification to the service terminal apparatus 3 if a transmission timing of the acquisition instruction of the apparatus status information specified by the service terminal apparatus 3 (i.e. a timing when the acquisition instruction is received from the service terminal apparatus 3 in Embodiment 5) is out of an operation period determined from the operation schedule information.

Therefore, apparatus status information is acquired from the image forming apparatus 101 or 201 at high possibility, and the image forming apparatus 101 or 201 can be managed smoothly.

The description has been presented for purposes of illustration and description, and is not intended to be exhaustive or limited.

For example, in Embodiment 1, 2, 4 or 5, the system may be configured so that the agent unit 111 or 211 does not transmit an event notification every time when an apparatus setting on an operation schedule is added and/or changed, and the remote maintenance server 1 inquires whether addition and/or change of an apparatus setting on an operation schedule occurred or not of the agent unit 111 or 211 using polling.

Further, in Embodiment 2, the system may be configured so that the schedule managing unit 43 of the remote maintenance server 1 informs an automatically set acquisition timing to the service terminal apparatus 3, and the service terminal apparatus 3 displays the acquisition timing for a service person.

Furthermore, in Embodiment 3, the system may be configured so that if transmission of the apparatus status information at the scheduled transmission timing failed specific plural times due to power off status, the agent unit 111 includes the timings when the transmission failed to the operation schedule information as non-operation timings of the image forming apparatus 101, and determines the scheduled transmission timing on the basis of the operation schedule information.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An apparatus management system, comprising:
an electronic apparatus;
an agent unit configured to acquire apparatus status information that indicates a status of the electronic apparatus from the electronic apparatus; and
a remote maintenance server configured to transmit an acquisition instruction of the apparatus status information to the agent unit and receive the apparatus status information from the agent unit if acquisition of the apparatus status information succeeded;
wherein the remote maintenance server is further configured (a) to acquire operation schedule information on the electronic apparatus, (b) to transmit an acquisition instruction of the apparatus status information to the agent unit, (c) to register a retransmission schedule of the acquisition instruction so as to transmit the acquisition instruction at a timing within an operation period of the electronic apparatus determined from the operation schedule if acquisition of the apparatus status information failed, and (d) to transmit the acquisition instruction to the agent unit at the timing of the retransmission schedule.

2. The apparatus management system according to claim 1, wherein:
the electronic apparatus comprises an apparatus setting unit that sets the operation schedule information on the electronic apparatus;
the agent unit is further configured to acquire the operation schedule information set by the apparatus setting unit from the electronic apparatus and transmit the operation schedule information to the remote maintenance server; and
the remote maintenance server is further configured to receive the operation schedule information from the agent unit.

3. The apparatus management system according to claim 1, wherein the remote maintenance server is further configured to transmit an acquisition instruction of the apparatus status information to the agent unit immediately upon receiving an acquisition instruction of the apparatus status information from a server terminal apparatus on a maintenance service provider side; and to transmit an acquisition failure notification to the service terminal apparatus and register a retransmission schedule of the acquisition instruction so as to transmit the acquisition instruction at a timing specified by the service terminal apparatus within an operation period of the electronic apparatus determined from the operation schedule information if acquisition of the apparatus status information failed.

4. The apparatus management system according to claim 1, wherein:
the operation schedule information includes operating day calendar information on an organization that uses the electronic apparatus; and
the remote maintenance server is further configured to register a retransmission schedule of the acquisition instruction so as to transmit the acquisition instruction at a timing within a day other than a holiday of the organization determined from the operating data calendar information if acquisition of the apparatus status information failed.

5. The apparatus management system according to claim 1, wherein the remote maintenance server is further configured to receive the apparatus status information from the agent unit and store the apparatus status information if acquisition of the apparatus status information succeeded, and to transmit the stored apparatus status information to a service terminal apparatus on a maintenance service provider side as a response to a request from the service terminal apparatus.

6. The apparatus management system according to claim 1, wherein the agent unit is built in either the electronic apparatus or a terminal apparatus connected to the electronic apparatus, and configured to perform data communication with the remote maintenance server through a network.

7. An apparatus management method, comprising the steps of:
transmitting an acquisition instruction of apparatus status information that indicates a status of an electronic apparatus to an agent unit that acquires the apparatus status information from the electronic apparatus;
acquiring operation schedule information on the electronic apparatus from the agent unit by a remote maintenance server that receives the apparatus status information from the agent unit and transmitting an acquisition instruction of the apparatus status information to the agent unit by the remote maintenance server, if acquisition of the apparatus status information succeeded; and
registering a retransmission schedule of the acquisition instruction by the remote maintenance server so as to transmit the acquisition instruction at a timing within an operation period of the electronic apparatus determined from the operation schedule information, and transmitting the acquisition instruction to the agent unit at the timing of the retransmission schedule by the remote maintenance server, if acquisition of the apparatus status information failed.

8. An electronic apparatus, comprising
an agent unit configured to transmit apparatus status information that indicates a status of an electronic apparatus to a remote maintenance server on a maintenance service provider side;
wherein the agent unit is further configured (a) to receive transmission schedule information on the apparatus status information from the remote maintenance server, (b) to acquire operation schedule information on the electronic apparatus set in the electronic apparatus, (c) to determine a transmission timing of the apparatus status information on the basis of both the transmission schedule information and the operation schedule information, and (d) to transmit the apparatus status information to the remote maintenance server at the transmission timing.

9. The electronic apparatus according to claim 8, wherein the agent unit is further configured (e) to inform the transmission timing to the remote maintenance server at a timing when the transmission timing is settled.

10. The electronic apparatus according to claim 8, wherein the agent unit is further configured (c1) to set a transmission timing specified by the transmission schedule information as a transmission timing of the apparatus status information if it is determined on the basis of the operation schedule information that the electronic apparatus is in operation at the transmission timing specified by the transmission schedule information, and (c2) to set a timing that is both earlier than a transmission timing specified by the transmission schedule information and within an operation period of the electronic apparatus determined from the operation schedule information as a transmission timing of the apparatus status information if it is determined on the basis of the operation schedule information that the electronic apparatus is out of operation at the transmission timing specified by the transmission schedule information.

11. The electronic apparatus according to claim 8, wherein the agent unit is further configured to, if the apparatus setting unit changes an operation schedule after the transmission timing is determined, change the transmission timing on the basis of both the transmission schedule information and the changed operation schedule information.

12. The electronic apparatus according to claim 11, wherein the agent unit is further configured to inform the changed transmission timing to the remote maintenance server at a timing when the transmission timing is changed.

13. The electronic apparatus according to claim 11, wherein the agent unit is further configured to change the transmission timing to a timing earlier than the original transmission timing.

14. An apparatus management system, comprising:
an electronic apparatus; and
a remote maintenance server on a maintenance service provider side;
wherein the electronic apparatus comprises an agent unit configured to transmit apparatus status information that indicates a status of an electronic apparatus to the remote maintenance server; and
the agent unit is further configured (a) to receive transmission schedule information on the apparatus status information from the remote maintenance server, (b) to acquire operation schedule information on the electronic apparatus set in the electronic apparatus, (c) to determine a transmission timing of the apparatus status information on the basis of both the transmission schedule information and the operation schedule information, and (d) to transmit the apparatus status information to the remote maintenance server at the transmission timing.

15. An apparatus management system, comprising:
an electronic apparatus;
an agent unit configured to acquire apparatus status information that indicates a status of the electronic apparatus from the electronic apparatus;
a remote maintenance server configured to transmit an acquisition instruction of the apparatus status information to the agent unit and receive the apparatus status information from the agent unit; and a service terminal apparatus configured to cause the remote maintenance server to output the acquisition instruction of the apparatus status information;

wherein the remote maintenance server is further configured (a) to acquire operation schedule information on the electronic apparatus, and (b) to perform warning notification to the service terminal apparatus if a transmission timing of the acquisition instruction of the apparatus status information specified by the service terminal apparatus is out of an operation period determined from the operation schedule information.

16. The apparatus management system according to claim 15, wherein:

the service terminal apparatus is further configured to output an acquisition instruction of the apparatus status information to the remote maintenance server; and the remote maintenance server is further configured to receive the acquisition instruction of the apparatus status information from the service terminal apparatus, to immediately perform warning notification to the service terminal apparatus if a timing when the acquisition instruction of the apparatus status information was received from the service terminal apparatus is out of an operation period determined from the operation schedule information, and to transmit an acquisition instruction of the apparatus status information to the agent unit if the timing when the acquisition instruction of the apparatus status information was received from the service terminal apparatus is within an operation period determined from the operation schedule information.

17. The apparatus management system according to claim 15, wherein:

the service terminal apparatus is further configured to output a setting instruction to set a transmission timing of an acquisition instruction of the apparatus status information to the remote maintenance server; and the remote maintenance server is further configured to receive the setting instruction from the service terminal apparatus, to immediately perform warning notification to the service terminal apparatus if the transmission timing set with the setting instruction is out of an operation period determined from the operation schedule information, and to set the transmission timing and transmit an acquisition instruction of the apparatus status information to the agent unit at the transmission timing if the transmission timing set with the setting instruction is within an operation period determined from the operation schedule information.

18. The apparatus management system according to claim 15, wherein the remote maintenance server is further configured to output the operation schedule information to the service terminal apparatus together with the warning notification.

19. The apparatus management system according to claim 15, wherein the operation schedule information includes an operation period of the electronic apparatus and the operation period is automatically determined from a power-on operation and a power-off operation of the electronic apparatus.

20. The apparatus management system according to claim 15, wherein the agent unit is built in either the electronic apparatus or a terminal apparatus connected to the electronic apparatus, and configured to perform data communication with the remote maintenance server through a network.

21. An apparatus management method, comprising the steps of:

transmitting an acquisition instruction of apparatus status information that indicates a status of an electronic apparatus to an agent unit that acquires the apparatus status information from the electronic apparatus, and acquiring operation schedule information on the electronic apparatus by a remote maintenance server that receives the apparatus status information from the agent unit; and performing warning notification to a service terminal apparatus by the remote maintenance server if a transmission timing of an acquisition instruction of the apparatus status information specified by the service terminal apparatus is out of an operation period determined from the operation schedule information.

22. A non-transitory computer readable recording medium storing an apparatus management program, wherein in a remote maintenance server that receives apparatus status information that indicates a status of an electronic apparatus from an agent unit that acquires the apparatus status information from the electronic apparatus, the apparatus management program causes a computer to perform the steps of:

transmitting an acquisition instruction of the apparatus status information to the agent unit;

acquiring operation schedule information on the electronic apparatus from the agent unit if acquisition of the apparatus status information succeeded; and registering a retransmission schedule of the acquisition instruction so as to transmit the acquisition instruction at a timing within an operation period of the electronic apparatus determined from the operation schedule information, and transmitting the acquisition instruction to the agent unit at the timing of the retransmission schedule, if acquisition of the apparatus status information failed.

23. A non-transitory computer readable recording medium storing an apparatus management program that causes a computer to act as an agent unit that transmits apparatus status information that indicates a status of an electronic apparatus to a remote maintenance server on a maintenance service provider side;

wherein the agent unit (a) receives transmission schedule information on the apparatus status information from the remote maintenance server, (b) acquires operation schedule information on the electronic apparatus set in the electronic apparatus, (c) determines a transmission timing of the apparatus status information on the basis of both the transmission schedule information and the operation schedule information, and (d) transmits the apparatus status information to the remote maintenance server at the transmission timing.

24. A non-transitory computer readable recording medium storing an apparatus management program, wherein in a remote maintenance server that receives apparatus status information that indicates a status of an electronic apparatus from an agent unit that acquires the apparatus status information from the electronic apparatus, the apparatus management program causes a computer to perform the steps of:

transmitting an acquisition instruction of the apparatus status information to the agent unit, and acquiring operation schedule information on the electronic apparatus; and performing warning notification to a service terminal apparatus if a transmission timing of an acquisition instruction of the apparatus status information specified by the service terminal apparatus is out of an operation period determined from the operation schedule information.

* * * * *